(12) United States Patent
Yasumoto

(10) Patent No.: US 8,374,339 B2
(45) Date of Patent: Feb. 12, 2013

(54) SECURITY SETTING METHOD OF WIRELESS COMMUNICATION NETWORK, WIRELESS COMMUNICATION NETWORK SYSTEM, CLIENT DEVICE AND RECORDING MEDIUM

(75) Inventor: Tomonori Yasumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1118 days.

(21) Appl. No.: 11/316,957

(22) Filed: Dec. 27, 2005

(65) Prior Publication Data

US 2007/0053508 A1   Mar. 8, 2007

(30) Foreign Application Priority Data

Sep. 6, 2005   (JP) .................. 2005-258389

(51) Int. Cl.
*H04K 1/00* (2006.01)
(52) U.S. Cl. ............ 380/28; 380/247; 380/259; 380/44; 713/151; 713/161; 713/168; 726/5; 726/26
(58) Field of Classification Search ................ 380/28
See application file for complete search history.

(56) References Cited

U.S. PATENT DOCUMENTS

| 7,127,234 | B2 | 10/2006 | Ishii | |
|---|---|---|---|---|
| 7,194,622 | B1 * | 3/2007 | Halasz et al. | 713/163 |
| 7,269,260 | B2 * | 9/2007 | Adachi et al. | 380/270 |
| 7,546,458 | B1 * | 6/2009 | Singla et al. | 713/166 |
| 7,660,986 | B1 * | 2/2010 | Qiu et al. | 713/166 |
| 7,742,602 | B2 * | 6/2010 | Ishidoshiro et al. | 380/270 |
| 2002/0032786 | A1 | 3/2002 | Yamada et al. | |
| 2002/0172365 | A1 | 11/2002 | Nakagomi et al. | |
| 2003/0063593 | A1 | 4/2003 | Koyanagi et al. | |
| 2003/0210671 | A1 | 11/2003 | Eglin | |
| 2004/0030895 | A1 | 2/2004 | Tachikawa | |
| 2004/0072580 | A1 | 4/2004 | Honda et al. | |
| 2004/0076300 | A1 | 4/2004 | Ishidoshiro | |
| 2004/0248557 | A1 * | 12/2004 | Muratsu | 455/411 |
| 2004/0259552 | A1 | 12/2004 | Ihori et al. | |
| 2005/0204164 | A1 | 9/2005 | Kakii | |
| 2006/0282898 | A1 | 12/2006 | Yamamoto et al. | |

FOREIGN PATENT DOCUMENTS

| CN | 1663179 | | 8/2005 |
|---|---|---|---|
| EP | 1 244 322 | | 9/2002 |
| EP | 1 395 002 | | 3/2004 |
| EP | 1 411 674 | | 4/2004 |
| GB | 2411554 | * | 8/2005 |
| GB | 2411554 A | | 8/2005 |
| JP | 2001-111544 | | 4/2001 |
| JP | 2002-55729 | | 2/2002 |

(Continued)

OTHER PUBLICATIONS

European Search Report dated Jan. 30, 2007.

(Continued)

*Primary Examiner* — Shewaye Gelagay
(74) *Attorney, Agent, or Firm* — Fujitsu Patent Center

(57) ABSTRACT

Method, program, network system and client device each has a structure of being given encryption information different from given present encryption information by use of the given present encryption information and being given different encryption information in incremental steps, to one or a plurality of the connection destinations (client device CLm), for security setting of wireless communication network (wireless LAN device 2) to one or a plurality of connection destinations.

13 Claims, 13 Drawing Sheets

FOREIGN PATENT DOCUMENTS

| | | |
|---|---|---|
| JP | 2002-281558 | 9/2002 |
| JP | 2003-110567 | 4/2003 |
| JP | 2003-309833 | 10/2003 |
| JP | 2003-338823 A | 11/2003 |
| JP | 2004-015725 | 1/2004 |
| JP | 2004-032133 | 1/2004 |
| JP | 2004-032664 A | 1/2004 |
| JP | 2004-040156 | 2/2004 |
| JP | 2004-064652 | 2/2004 |
| JP | 2004-072682 | 3/2004 |
| JP | 2004-096306 | 3/2004 |
| JP | 2004-127187 | 4/2004 |
| JP | 2004-215232 | 7/2004 |
| JP | 2004-312257 | 11/2004 |
| JP | 2004-320162 | 11/2004 |
| JP | 2004-343448 A | 12/2004 |
| JP | 2004-363878 A | 12/2004 |
| JP | 2005-110135 A | 4/2005 |
| JP | 2005-136897 A | 5/2005 |
| JP | 2005-149337 A | 6/2005 |
| JP | 2005-223891 A | 8/2005 |
| WO | WO 01/11451 A1 | 2/2001 |
| WO | WO 2005/013550 | 2/2005 |

OTHER PUBLICATIONS

"Chinese Office Action", Full English translation, Mailed Jan. 18, 2008 from CN Patent Office for corresponding CN Patent App. No. 200610001915.X.

Japanese Office Action, Partial English-language Translation, mailed Mar. 29, 2011 for corresponding Japanese Application No. 2005-258389.

Japanese Office Action dated Nov. 1, 2011 for corresponding Japanese Patent Application No. 2005-258389, Partial English-language Translation.

* cited by examiner

FIG.8

| SL | EXAMPLE 1 | EXAMPLE 2 | EXAMPLE 3 |
|----|-----------|-----------|-----------|
| 0 | NoWEP ↓ | NoWEP ↓ | NoWEP ↓ |
| 1 | WEP64[bit] ↓ | WEP48[bit] ↓ | WEP64[bit] ↓ |
| 2 | WEP128[bit] ↓ | WEP64[bit] ↓ | WPA |
| 3 | IEEE802.1X ↓ | WEP128[bit] ↓ | |
| 4 | WPA | WPA-PSK | |

FIG.13

| SL | EXAMPLE 1 | EXAMPLE 2 | EXAMPLE 3 |
|---|---|---|---|
| 0 | NoWEP ↓ | NoWEP ↓ | NoWEP ↓ |
| 1 | WEP 4 8 [bit] ↓ | WEP 4 8 [bit] ↓ | WEP 6 4 [bit] ↓ |
| 2 | WEP 6 4 [bit] ↓ | WEP 6 4 [bit] ↓ | WPA |
| 3 | WEP 1 2 8 [bit] ↓ | WEP 1 2 8 [bit] ↓ | |
| 4 | IEEE802.1X ↓ | WPA−PSK | |
| 5 | WPA | | |

SECURITY SETTING METHOD OF WIRELESS COMMUNICATION NETWORK, WIRELESS COMMUNICATION NETWORK SYSTEM, CLIENT DEVICE AND RECORDING MEDIUM

CROSS-REFERENCE TO RELATED APPLICATIONS

This application is based upon and claims the benefit of priority from the prior Japanese Patent Application No. 2005-258389, field on Sep. 6, 2005, the entire contents of which are incorporated herein by reference.

BACKGROUND OF THE INVENTION

1. Field of the Invention

The present invention relates to an automated security setting of a wireless communication network such as a wireless local area network (hereinafter LAN) etc., more particularly, to security setting method of wireless communication network, security setting program, wireless communication network system and client device, in which security setting of a client device, an access point device and so on connected with a wireless LAN is automated.

2. Description of the Related Art

A wireless LAN is a method of transmitting/receiving data using a radio wave wherein a wireless communication can be provided over obstacles such as walls etc. As a communication method of the wireless LAN, there are a mode of communicating through an access point as a relay point, and a mode of communicating between the terminals without using the access point. Differently from a wired LAN, a wireless LAN is accessible from outside if a radio frequency reaches thereto. It is therefore necessary for the wireless LAN to set security, for example, between a client device and an access point device for wireless communication. Generally, an operator operating each device is requested for manually entering the same encryption key for security setting, which is trouble making for the operator.

Referring to security setting for the wireless LAN, there is a configuration having an automated setting at the client side based on the access point setting information so that complicated setting operations can be eliminated (Japanese Patent Application, Laid-open Publication No. 2004-127187). There is a configuration that an access point transmits a wired equivalent privacy (hereinafter WEP) key to a client terminal, after the transmission is acknowledged, a media access control (hereinafter MAC) address of the client terminal is registered, and the client terminal sets the transmitted WEP key by itself (Japanese Patent Application Laid-open Publication No. 2004-215232). There is a configuration that a client transmit a public key and a one-way Hash to an access point, the access point transmits the one-way Hash to a recognition server, an access point encrypts a WEP key generated by the recognition server, the client receives the encrypted WEP key, and the WEP key is obtained by decoding it using a secret key (Japanese Patent Application Laid-open Publication No. 2004-15725). There is a configuration for permitting a guest identification (hereinafter ID) connection using a guest ID in case where the guest ID is accompanied by a connection request of a client to be connected with an access point through wireless LAN (Japanese Patent Application Laid-open Publication No. 2004-40156).

There is a configuration that a terminal transmits a request for recognition to an access point, the access point transmits a MAC address to a recognition server in a recognition server protocol of the recognition server, the recognition server executes the MAC address recognition and transmits a challenge text, and the access point performs encryption recognition with a base station in accordance with a WEP algorithm process specified in IEEE 802.11 (Japanese Patent Application Laid-open Publication No. 2001-111544). There is a configuration provided with a communication terminal receiving recognition from a recognition server through a network and a base station transferring communication performed by the communication terminal through a virtual LAN, for receiving security information generated by each of the virtual LAN from the recognition server (Japanese Patent Application Laid-open Publication No. 2004-312257). There is a configuration for transmitting a necessary recognition data to the client terminal for settling a connection using a high level encryption system requiring recognition process after settling a communication using a low level encryption system between a client and an access point (wireless communication) is settled (Japanese Patent Application Laid-open Publication No. 2004-72682).

By the way, security setting for a client to be allowed to connect from the access point connected with the wireless LAN requires troublesome operations. For allowing the connection, the configuration disclosed in Japanese Patent Application Laid-open Publication No. 2004-72682 requires a client for a low-level security setting, and without the low-level security setting. In the case where one-step security setting system is used without security setting, the security setting information in such environment may be leaked, which breaks its security.

There is a case that the access point is stopped for changing its security setting every time when security setting is changed, such stopping causes negative effects on communication of other client being connected, which is inconvenient.

The above Japanese Patent Application Laid-open Publication No. 2004-127187, Japanese Patent Application Laid-open Publication No. 2004-215232, Japanese Patent Application Laid-open Publication No. 2004-15725, Japanese Patent Application Laid-open Publication No. 2004-40156, Japanese Patent Application Laid-open Publication No. 2001-111544, Japanese Patent Application Laid-open Publication No. 2004-312257, Japanese Patent Application Laid-open Publication No. 2004-72682, do not disclose or teach the above problems and their solutions are not described or taught.

SUMMARY OF THE INVENTION

It is a first object of the present invention to automate security setting of a device to be connected with the wireless communication.

It is a second object of the present invention to make higher security level of the device to be connected with the wireless communication.

It is a third object of the present invention to make security setting for a specific connection destination executable without disturbing communication of other connection destinations.

In order to achieve the first or second object, according to a first aspect of the present invention there is provided a security setting method for wireless communication network to one or a plurality of connection destinations, comprising the operation of being given encryption information different from given present encryption information by use of the given present encryption information and being given different encryption information in incremental steps, to one or a plurality of said connection destinations.

According to the above processing, resulting from being given other encryption information into updated encryption information in incremental steps based on the present encryption information, a multiple-step security can be set automatically so that safety of communication can be made higher.

In order to achieve the above first or second object, the security setting method may comprise the operation of being permitted to connect with one or a plurality of said connection destinations not given encryption information and being given encryption information in the case where said connection destination is a connectable object.

According to the above processing, a higher priority for connection is given to a connection destination to which encryption information is not given yet, encryption information is given after it is determined whether the connection destination is a connectable object or not. Before being given the encryption information, presetting a processing determining whether the connection destination is right or not as a connection destination, the connection destination is selected for being given the encryption information so that the security of communication is assured.

In order to achieve the above third object, the security setting method may comprise the operation of giving identification information to said connection destinations, configuring virtual communication network with respect to each said identification information, and being given said encryption information for every said connection destinations given said identification information.

According to the above configuration, security can be set by a concurrent processing using a plurality of virtual communication network during security setting period without breaking communication etc. with other connection destination.

In order to achieve the above first or second object, the security setting method may comprise the operation of obtaining identification information from said connection destinations given the encryption information and distinguishing said connection destination as connectable object.

According to the above configuration, identification information such as MAC address etc. assigned to connection destination is obtained to distinguish connection destination or not therefore security before giving an encryption information is assured.

In order to achieve the above first or second object, in the security setting method, the different encryption information to be given in incremental steps may be encryption information with in incremental steps high security level.

According to the above configuration, security of communication can be raised by setting security level higher in incremental steps, encryption information is acceptable if different, therefore security level made higher in incremental steps may be made lower in stepwise manner.

In order to achieve the above first or second object, according to a second aspect of the present invention there is provided a security setting program to be executed by computer configuring wireless communication network with one or a plurality of connection destinations, comprising the step of being given encryption information different from given present encryption information by use of the given present encryption information and being given different encryption information in incremental steps, to one or a plurality of said connection destinations. According to the security setting program, the above described security setting can be automated by the computer processing.

In order to achieve the above first or second object, the security setting program may comprise the step of being permitted to connect with one or a plurality of said connection destinations not given encryption information and being given encryption information in the case where said connection destination is connectable object. According to the security setting program, the above described security setting can be automated by the computer processing.

In order to achieve the first or second object, the security setting program may comprise the step of giving identification information to said connection destinations, configuring virtual communication network with respect to each said identification information, and being given said encryption information for every said connection destinations given said identification information.

In order to achieve the third object, according to a third aspect of the present invention there is provided a wireless communication network system having a wireless communication device connected to one or a plurality of connection destinations, wherein, by giving encryption information different from present encryption information given by said wireless communication device by use of the present encryption information, said wireless communication device gives different encryption information in incremental steps to said connection destination.

According to the above configuration, based on the present encryption, as a result of being given other encryption information into updated encryption information in incremental steps, a multiple-step security for the wireless communication device can be set automatically so that safety of communication can be made higher.

In order to achieve the above first or second object, in the wireless communication network system, said wireless communication device may be permitted to connect to one or a plurality of said connection destinations not given encryption information and give encryption information to said connection destination in the case where said connection destination is connectable object.

According to the above configuration, a higher priority for connection is given to a connection destination to which encryption information not given yet, encryption information is given after it is determined whether the connection destination is connectable or not. Before being given the encryption information, presetting a processing determining whether the connection destination is right or not as connection destination, the connection destination is selected for being given the encryption information therefore the security of communication is assured.

In order to achieve the above first or second object, in the wireless communication network system, said wireless communication device may comprise a wireless communication part performing wireless communication with one or a plurality of connection destinations, permit to connect with one or a plurality of said connection destinations not given encryption information, and give encryption information to said connection destination in the case where said connection destination is connectable object.

In order to achieve the above first or second object, in the wireless communication network system, said wireless communication device may give identification information to said connection destinations, configure virtual communication network with respect to each said identification information, and give said encryption information for every said connection destinations given said identification information.

In order to achieve the above first or second object, the wireless communication network system may comprise an access point device performing wireless communication with one or a plurality of connection destinations.

In order to achieve the above first, second or third object, according to a forth aspect of the present invention there is provided a wireless communication network system having a server device connected to one or a plurality of connection destinations, comprising: an access point device performing wireless communication with one or a plurality of connection destinations; and a switch installed between the access point device and said server device, and forms virtual communication network between said server device and said connection destination.

In order to achieve the above first, second or third object, according to a fifth aspect of the present invention there is provided a client device connected to a server device or an access point device through wireless communication network, wherein the client device receives encryption information different from present encryption information given from said server device or said access point device, by use of the present encryption information, and is given different encryption information in incremental steps.

According to the above configuration, security of the client device side can be set from the server device or access point device in incremental steps so that troubles of manual setting at the client device side can be eliminated and also leakage of information during setting can be protected.

In order to achieve the above first, second or third object, in the client device, the client device may comprise a wireless communication part performing wireless communication with said server device or said access point device, be permitted to connect to said server device or said access point device, and be given encryption information in the case where the client device is distinguished as connectable object on the side of said server device or said access point device.

In order to achieve the above first, second or third object, in the client device, the client device may be given identification information from said server device or said access point device, configure virtual communication network to said server device or said access point device with respect to each said identification information, and be given said encryption information.

Technical advantages and features of the present invention are as follows:

(1) Security setting of the connection destination can be automated, for reducing troubles of setting.

(2) Information can be prevented from leaking even during security setting.

(3) Security can be set without disturbing communication etc. of other connection destination during security setting.

Other objects, features and advantages of the present invention can be further clarified by referring to the attached drawings and embodiments of the present invention.

BRIEF DESCRIPTION OF THE DRAWINGS

FIG. 8 is a table showing an example of a setting of security levels.

FIG. 13 is a table showing other example of a setting of security levels.

DETAILED DESCRIPTION OF THE PREFERRED EMBODIMENTS

First Embodiment

Figure 1:
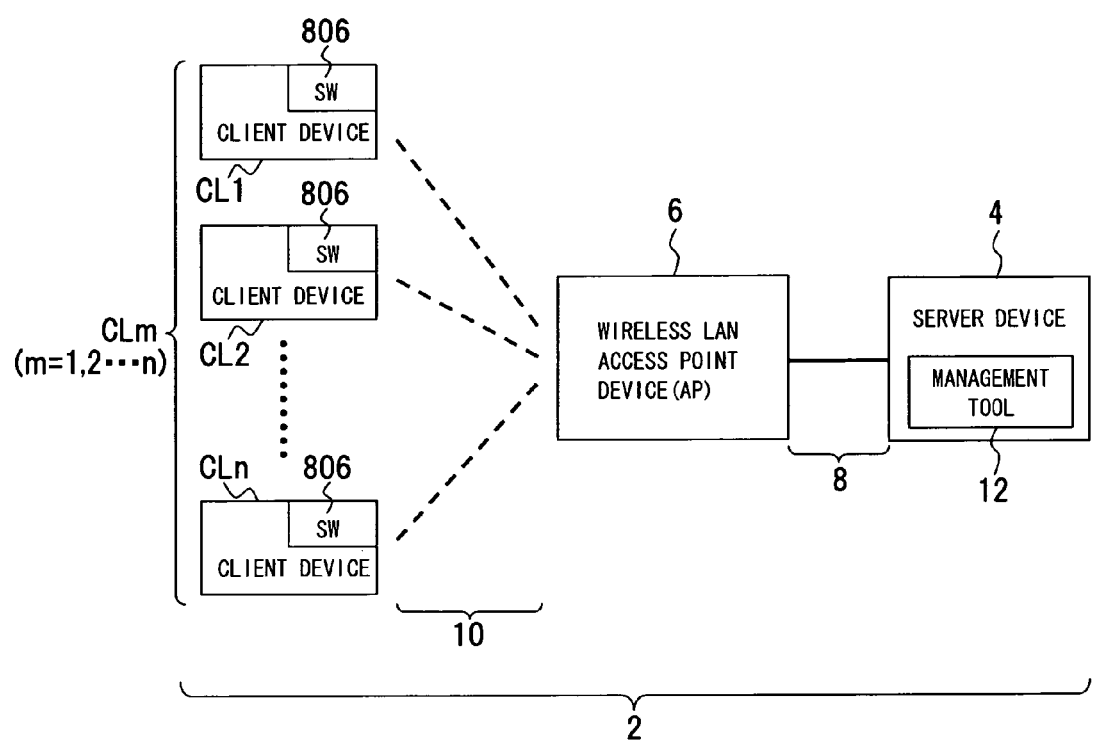
FIG. 1 is a block diagram showing a wireless LAN device according to a first embodiment of the present invention.

A first embodiment of the present invention is descried referring to FIG. 1. FIG. 1 is a block diagram showing an outline of a wireless LAN device according to a first embodiment of the present invention.

As a wireless communication network or a wireless communication network system, a wireless LAN device 2 includes, for example, a server device 4 and a wireless LAN access point device (hereinafter described simply as AP) 6 as a wireless communication device. The wireless LAN device 2 includes, for example, one or a plurality of wireless LAN client devices (hereinafter described simply as clients) CLm ("m" represents a number of a client such as m=1, 2 . . . n) as wireless communication devices of connection destination. Clients are therefore denoted as CL1, CL2 . . . CLn. In this case, the server device 4 and the AP 6 are connected with a wired LAN 8, the AP 6 and each of clients CL1, CL2 . . . CLn are connected with a wireless LAN 10. The server device 4 is a computer for sharing files, printers and the other resources through the wired LAN 8 and the wireless LAN 10. In this case, the server device 4 have a wired communication function for connecting with the AP 6. The AP 6 configures a radio wave relay station to the clients CLm and has a wireless communication function to connect with the clients CLm and a wired communication function to connect with the server device 4. The clients CLm (=CL1, CL2 . . . CLn) are computers for utilizing the shared resources of the server device 4 and have a wireless communication function to connect with the AP 6 using the wireless LAN 10. In this case, the wireless LAN 10 includes an intra-communication network, other various communication networks and a plurality of networks.

The server device 4 includes server functions such as the wireless communication function to connect with the clients CL1, CL2 . . . CLn, and a server function for transmitting and receiving data, and stores a management tool 12 for managing the AP 6. In this case, the server function of the server device 4 may be allocated in the side of the AP 6, or the server device 4 and the AP 6 can be configured as an integrated device.

The management tool 12 includes a security setting software 120 to provide an automatic security setting and stores, as an identification information for identifying a client of connection destination of the AP 6, "n" number of media access control (hereinafter MAC) information for identifying the above described one of clients CL1, CL2 . . . CLn, security levels (SL=0, 1, 2, . . . ) to be set to clients CL1, CL2 . . . CLn as security information, and a group of security setting values ("n" number) Such information are stored in a table of the server device 4.

Security setting is specifically exemplified as follows if the security levels are defined as SL=0 (No security), SL=1, SL=2. Here, the level of security means that it goes up in a stepwise manner depending on the number.
SL=0: No WEP (No security)
SL=1: WEP 48 [bit]
SL=2: WEP 64 [bit], WEP 128 [bit],
 IEEE802.1X, WPA-PSK, WPA . . .

In the above SL=0, 1, 2, WEP stands for Wired Equivalent Privacy (hereinafter WEP), which is a standard encryption system. IEEE 802.1X stands for Institute of Electrical and Electronic Engineers (hereinafter IEEE) 802.1X, which is a user recognition standard of LAN. WPA-PSK stands for WiFi Protected Access Pre-shared Key, WPA stands for WiFi Protected Access, and WPA-PSK and WPA are encryption function for enhanced security.

In the above exemplification, a plurality of security standards are exemplified for security level SL=2, any one of the security standard can be selected for SL=2, or new security levels may be set as SL=3, SL=4 . . . .

In addition, each one of the clients CL1, CL2 . . . CLn is assigned the above described MAC information (MAC address) respectively as an identification information for identifying each of the clients, and stores therein a security setting software 806 as FIG. 4 for setting security automatically in cooperation with the security setting software 120 of the management tool 12.

Figure 2:
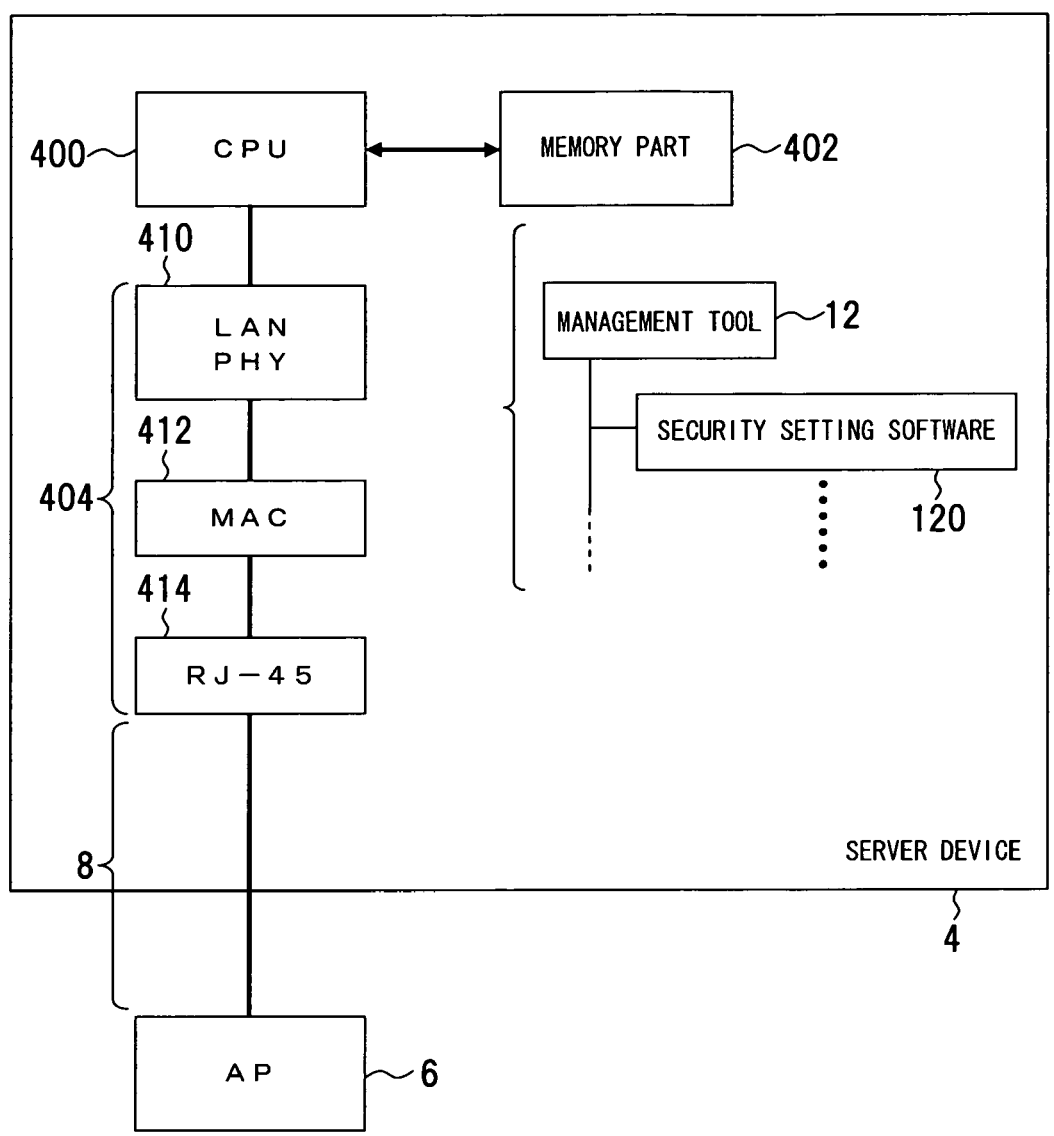
FIG. 2 is a block diagram showing a configuration example of a server device.

Next, a configuration example of the server device 4 is described referring to FIG. 2. FIG. 2 is a block diagram showing a configuration example of the server device 4 of the present invention. In FIG. 2, the same reference numerals are attached to the same constituents in FIG. 1.

The server device 4 includes a central processing unit (hereinafter CPU) 400, a memory part 402, a wired communication part 404 and so on. The memory part 402 comprises Read-Only Memory (hereinafter ROM), Flash ROM, and Random Access memory (hereinafter RAM), which stores therein the above described management tool 12. The management tool 12 stores therein the security setting software 120 and other software.

The wired communication part 404 is a part to perform the wired communication with the AP 6, and is equipped with a LAN physical layer part (hereinafter LAN PHY) 410, the Media Access Control (hereinafter MAC) controller part 412, a LAN connector 414 and a specified cable therebetween. As for data transmitting and receiving between the CPU 400 and the AP 6, a physical address is set by the LAN PHY 410, and a MAC address is assigned by the MAC controller part 412 within the wired LAN 8. As a specified standard connector, for example, RJ-45 is used for the LAN connector 414.

Figure 3:
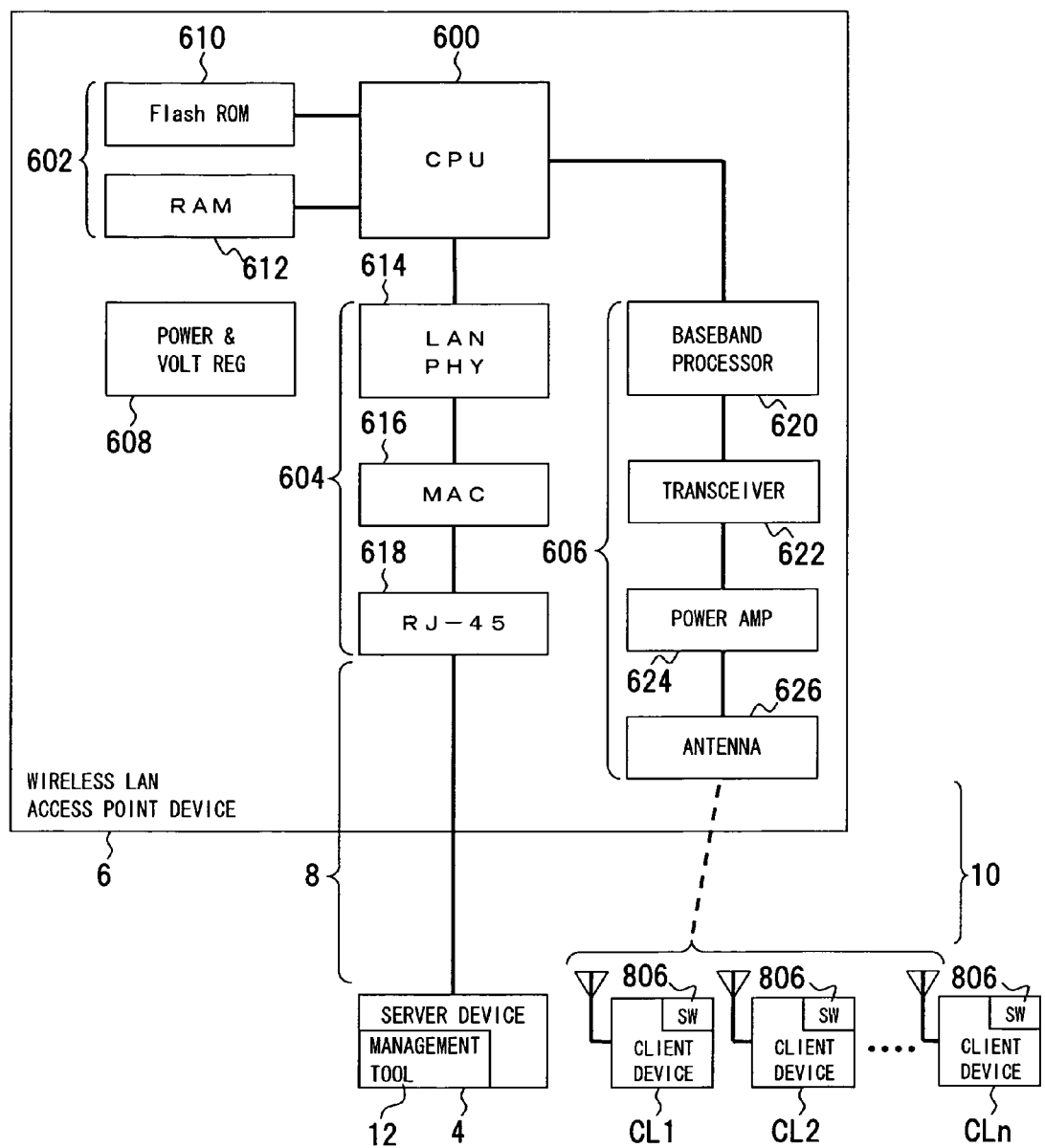
FIG. 3 is a block diagram showing a configuration example of an access point device.

Next, a configuration example of AP 6 is described referring to FIG. 3. FIG. 3 is a block diagram showing an example of an access point device configuration of the present invention. In FIG. 3, the same reference numerals are attached to the same constituents in FIG. 1.

The AP 6 stores therein a Central Processing Unit (hereinafter CPU) 600, a memory part 602, a wired communication part 604, a wireless communication part 606, a power supply part 608. The memory part 602 stores therein a Flash read-only memory (hereinafter ROM) 610 and a random access memory (hereinafter RAM) 612, and the Flash ROM 610 stores therein a control program etc.

The wired communication part 604 is a part to perform a wired communication with the server device 4, and includes, as configuration corresponding to the server device 4, a LAN physical layer part (hereinafter LAN PHY) 614, a MAC controller part 616, a LAN connector 618, and a specified cable etc. As for Data transmitting and receiving between the CPU 600 and the server device 4, a physical address is set by the LAN PHY 614, and a MAC address is set by the MAC controller part 616 within the wired LAN 8. As a specified standard connector, for example, RJ-45 is used for the LAN connector 618.

The wireless communication part 606 is a part to perform wireless communication with the clients CL1, CL2 . . . CLn, and includes a baseband processor 620 as a communication controller, a transceiver part 622 as a radio frequency (RF) part, and a power amplifier part 624, and an antenna 626 are provided. In the wireless communication part 606, the baseband processor 620 delivers data to the transceiver part 622, the data is modulated through the transceiver part 622 and amplified by the power amplifier part 624, and then transmitted through the antenna 626 as an electromagnetic wave against the clients CL1, CL2 . . . CLn. The electromagnetic wave from the clients CL1, CL2, . . . CLn is received by an antenna 626, demodulated by the transceiver part 622, decoded by the baseband processor 620, and delivered to the CPU 600.

The power supply part 608 provides a constant power output; the constant power output is supplied to the various constituents of the circuit-structure including CPU 600 etc.

Figure 4:
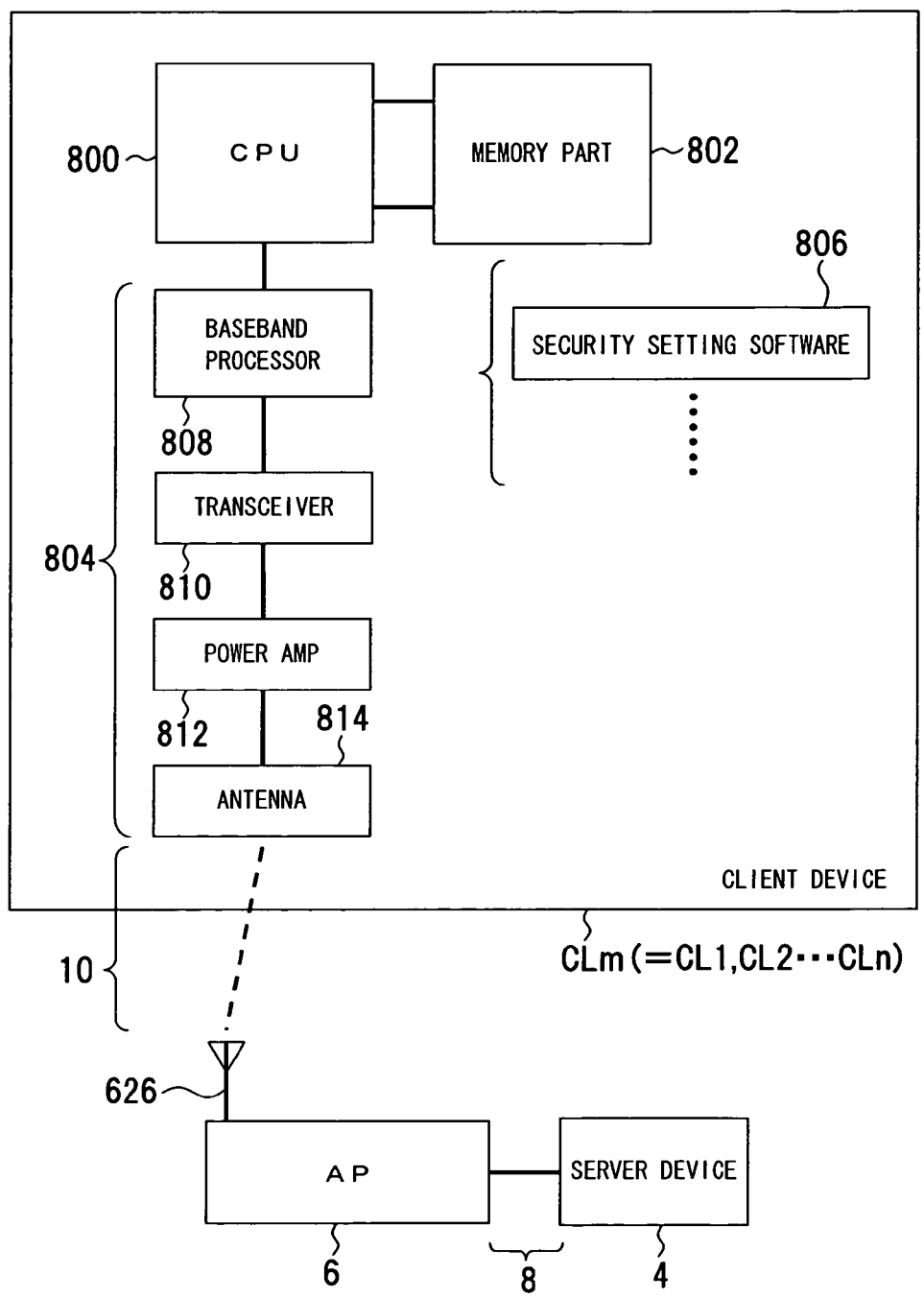
FIG. 4 is a block diagram showing a configuration example of a client device.

Next, a configuration example of each of client devices CLm (=CL1, CL2, . . . CLn) is described referring to FIG. 4. FIG. 4 is a block diagram showing a configuration example of a client device CLm configuration of the present invention. In FIG. 4, the same reference numerals are assigned to the same constituents in FIG. 1.

A client CLm has a CPU 800 as a data processing part, a memory part 802, and a wireless communication part 804 etc. The memory part 802 is composed of ROM, Flash ROM, and RAM etc., and stores therein the above described security setting software 806 corresponding to the security setting software 120 of the management tool 12 of the AP 6 and other software.

The wireless communication part 804 is a part to perform wireless communication with the AP 6. The wireless communication part 804 includes a baseband processor 808 as a communication controller part, a transceiver part 810 as a radio frequency (RF) part, a power amplifier part 812, and an antenna 814. The baseband processor 808 delivers data to the transceiver part 810, the transceiver part 810 modulates the data, and the power amplifier part 812 amplifies the data for transmitting through the antenna 814 to the AP 6 by means of electromagnetic frequency. The electromagnetic frequency from the AP 6 is received by the antenna 814, demodulated by the transceiver part 810, then, decoded by the baseband processor 808 and received by the CPU 800.

Figure 5:
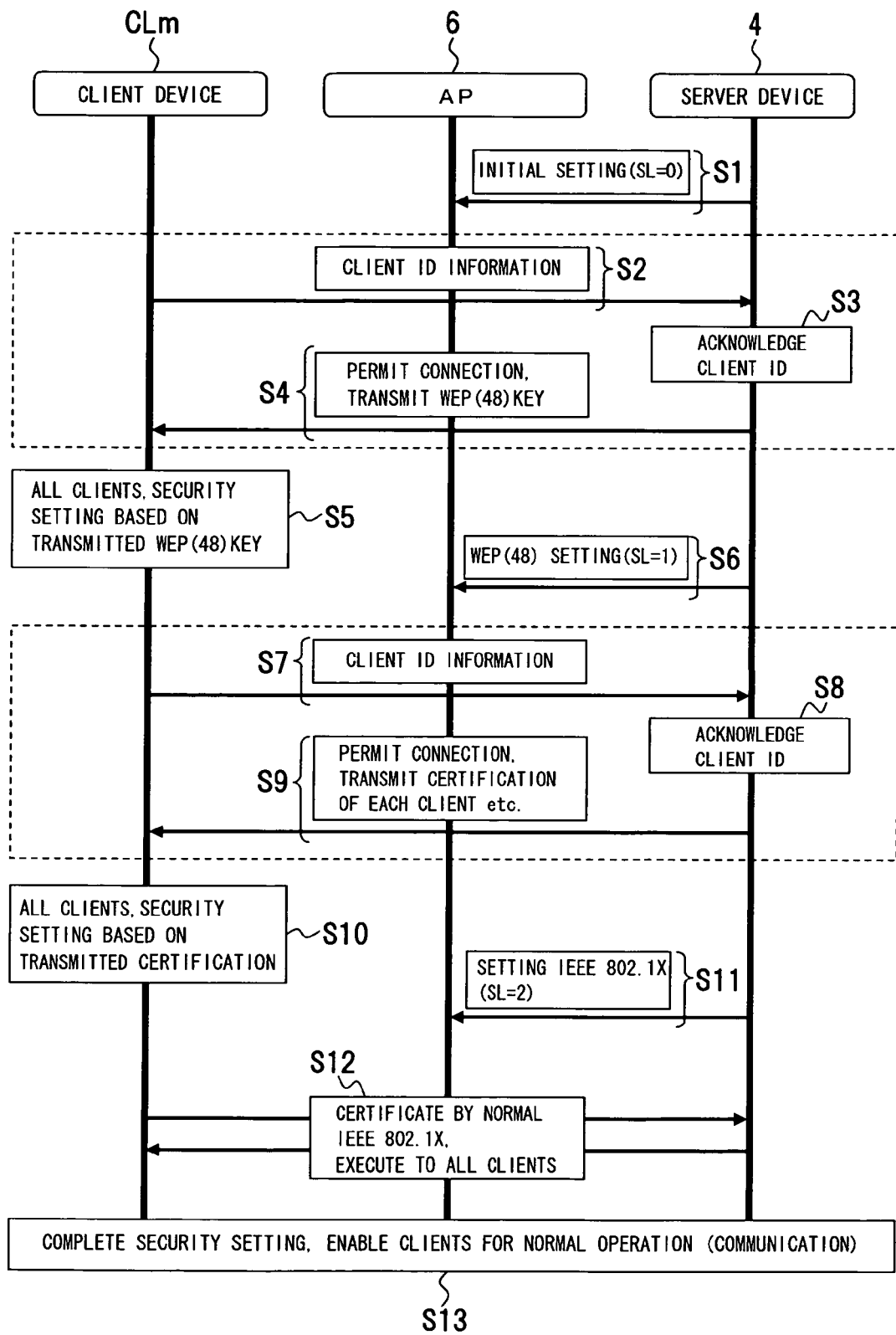
FIG. 5 is a flow chart showing sequential steps on an automated security setting of a client device, an access point device, and a server device.

Next, automated setting of security is described referring to FIG. 5. FIG. 5 is a flow chart showing an automated security setting by sequential processing steps of a client device, an access point device, and a server device. In FIG. 5, the same reference numerals are attached to the same constituents in FIG. 1. This flow chart shows the case that multiple service set identifier (hereinafter SSID) and a virtual LAN (hereinafter VLAN) are not present. Here, SSID is an identifier to identify a network, VLAN is a function for optionally dividing the network without limitation of a physical network structure.

In the automated setting of security, the server device 4 instructs the AP 6 an initial setting of a security level SL=0 (Step S1), based on this initial setting (SL=0), the client identification (hereinafter ID) information is received by the server device 4 through the AP 6 as an identification information from one of the client devices CLm (CL1, CL2 . . . CLn) (Step S2).

The client ID information includes the above described MAC information etc. representing each of the client devices CLm. The server device 4 acknowledges a client ID based on the informed client ID information (Step S3). The server device 4 determines whether or not the client is registered in a list of the server device 4. If the client devices CLm transmitted the client ID is a registered client in the server device 4, connection is permitted, permission of connection is given to the client device CLm through the AP 6, and delivers a WEP (48) key as an encrypted information (a group of encrypted values) (Step S4). Operations of Step S2 to Step S4 enclosed by a dotted line is executed for all of the client devices CL1, CL2 . . . CLn, therefore the operations are repeated as many as the number of client devices "n".

The client device CLm executes the security setting depending on the transmitted WEP (48) key (Step S5). This security setting is performed by all the client devices received the WEP (48) key.

Next, the server device 4 instructs the AP 6 the setting of security level of SL=1. In this flow chart, WEP (48) is instructed to be set (Step S6), based on the security setting of SL=1, the server device 4 receives the client ID information of the client device CLm as an identification information through the AP 6 from the client CLm (Step S7). This client ID information is the above described MAC information. The server device 4 acknowledges again the client ID based on the client ID information received to acknowledge whether or not the client is a registered client in the list of the server device 4 (Step S8). Continuous connection is permitted if the client device CLm transmitted the client ID is a registered client in the server device 4, the server device gives permission of connection continuously through the AP 6 for the client device CLm, and transmits certification etc. of each client CLm as encryption information (a group of encrypted values) (Step S9). Operations of Step S7 through S9 encircled by the dotted line are executed for all client devices CLm by repeating as many as the number of client devices "n".

The client device CLm executes security setting depending on certification transmitted by the server device 4 (Step S10). This security setting is executed by all the client devices received the certification from the server device 4.

Next, the setting of the security level SL=2 is instructed from the server device 4 to the AP 6. In this case, IEEE 802.1X is instructed to set (Step S11). Based on this security setting (SL=2), a normal IEEE 802.1X recognition is executed for all the client devices CLm (Step S12).

As such client identification and security setting in stepwise manner, the security setting is completed through SL=0, SL=1, SL=2 so that the client device CLm executed the security setting are enabled for normal operation (communication) (Step S13).

According to the structure of the embodiment, security setting for all the client devices CLm (=CL1, CL2, . . . CLn) are automatically performed from the server device 4 through the AP 6, in addition, security level is set through multiple security levels so that the group of encryption values are not stolen by a third person on the way of the security setting, and communication safety can be assured.

Figure 6:
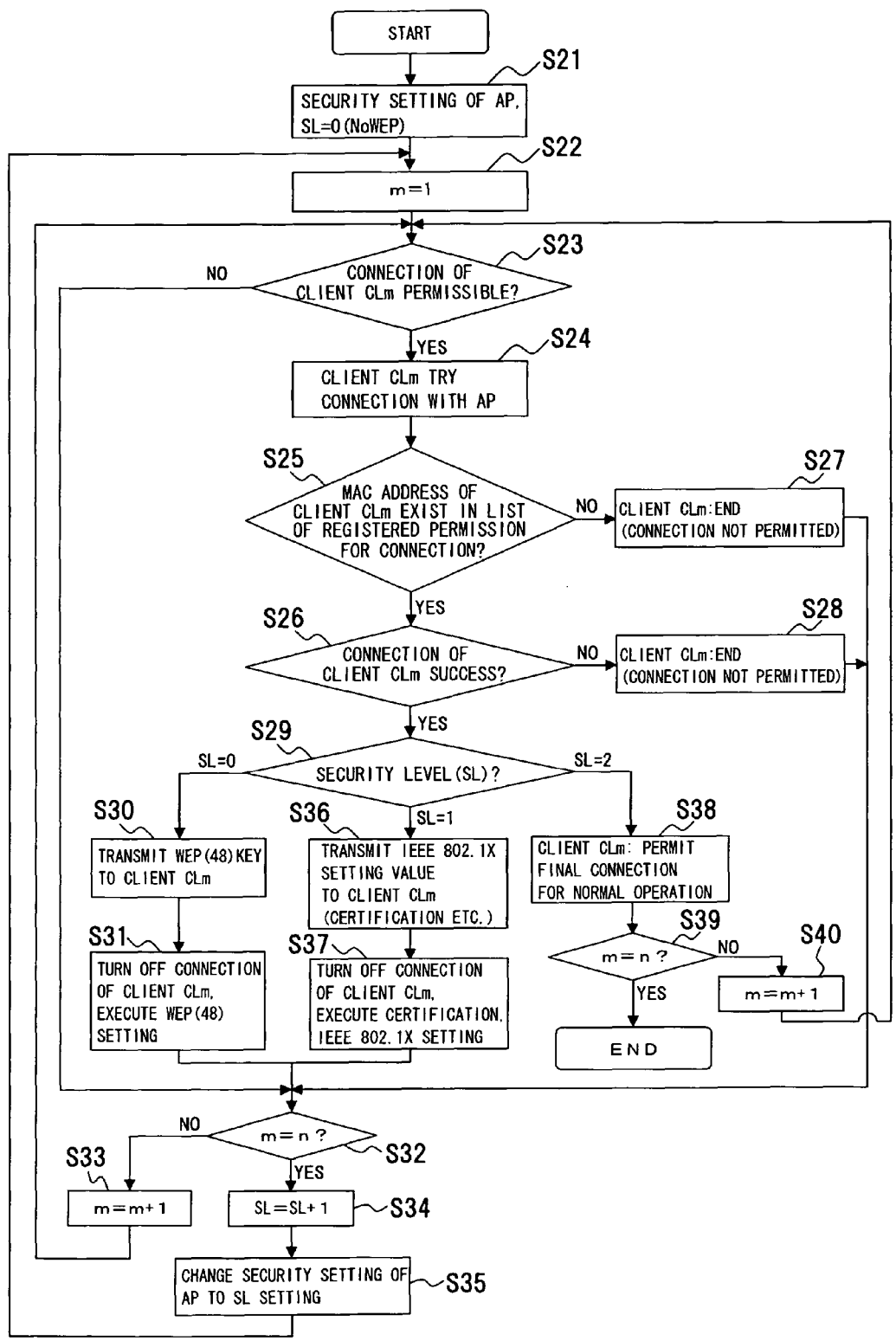
FIG. 6 is a flow chart showing a security setting method and a security setting program according to a first embodiment of the present invention.

Next, the processing contents of the security setting software 120 in the management tool 12 is described referring to FIG. 6. FIG. 6 is a flow chart showing a security setting method and a security setting program. In the flow chart showing FIG. 6, "m" represents a number of client device, "n" represents client number, SL stands for a security level, that is, SL=0: NoWEP, SL=1: WEP (48 [bit]), and SL=2: IEEE802.1X.

By activating the security setting software 120, the security setting of the AP 6 is set as SL=0 (: NoWEP) (Step S21). A client device number "m" is selected as m=1 (Step S22) so that the first client device CLm (=CL1) is judged whether or not the client device is connectable (Step S23). This judgment step determines whether or not the client device is a client device that the MAC address is regarded in the server device 4. Either connection permissible or not permissible is selected.

If connection is not permissible, the process jumps to Step S32, if connection is permissible, the client device CLm tries to connect with the AP 6 (Step S24). It is judged whether or not the MAC address of the client device CLm exists in list of the registered permission for connection in the server device 4 (Step S25). If a client device CLm is registered in the list, it is judged whether the connection of the client device CLm is a success or failure. (Step S26).

Here, if the client device CLm does not exist in the list at Step S25, the connection of the client device CLm is not permitted (Step S27), the flow goes to Step S32. If the connection of the client device CLm is ended in a failure at the Step S26, similarly, the connection is not permitted (Step S28) and the process goes to Step S32.

If the connection of the client device CLm is a success, security level (SL) is determined (Step S29). If SL=0, WEP (48) key as an encryption information is transmitted to the client device CLm as a transition into SL=1 of the security level (Step S30), after the connection of the client device CLm is disconnected, the setting of WEP (48) is performed (Step S31).

To perform the above described steps for all the client devices CLm, after the WEP (48) is set, it is determined whether or not the client device number "m" is m=n (Step S32). If m≠n, since the steps are not implemented for all the client devices CLm so that the present client device number "m" is incremented (=m+1) (Step S33), then the process returns to Step S23 to perform the steps from S23 through S32.

If the process reaches at m=n at the judgment step of client device number (Step S32), it is determined that the setting of WEP (48) is completed in the last client device CLn. The security level SL is then incremented (=SL+1) (Step S34), the security setting SL of the AP 6 is changed (to for example, SL=1) (Step S35), and the flow returns to Step S22.

If m=1 is selected for the client device number "m" (Step S22), and if the client device CLm (=CL1) is not permitted for connection at the judgment step to determine whether or not connectable (Step S23), the flow goes to Step S32. If the connection is permitted, the client device CLm tries to connect with the AP 6 (Step S24), it is judged whether or not a MAC address of the client device CLm exists in the list of the registered permission for connection in the server device 4 (Step S25). If the client device CLm exists in the list, it is judged whether the connection of the client is a successes or not (Step S26).

If the connection of the client device CLm is a success, the security level (SL) is judged (Step S29). If the present security level is SL=1, a setting value (certification etc.) of IEEE802.1X as encryption information is delivered to the client device CLm for transition into the security level of SL=2. (Step S36). The setting of the IEEE802.1X is implemented after the connection of the client device CLm is disconnected (Step S37).

After the above described steps, the client device number "m" is determined (Step S32), the client device number "m" is incremented (=m+1) (Step S33), and then the setting of IEEE802.1X as encryption information is implemented for all the client devices CLm.

When the process reaches at m=n, the security level SL is incremented (=SL+1) (Step S34), the security level SL of the AP 6 is changed (to for example SL=2) (Step S35), and the process returns to Step S22.

After the process of the Steps S22 through S29, if the security level of the client device CLm is SL=2, the client device CLm is enabled to perform normal operation after the final permission for connection, after the final permission for connection (Step S38) after a client device number "m" is judged (Step S39), and the client device number "m" (=m+1) is incremented (Step S40), all client devices CLm are enabled to perform normal operation by the final permission for connection, thus all steps are completed.

By the above described processing, security setting can be automated, the multiple security levels SL can be set in a stepwise manner to reach at the final security level. The risk that the group of encryption values is stolen by a third pert on the way of the setting becomes low.

Next, an automated setting operation of security is described referring to FIG. 7A, FIG. 7B, FIG. 7C, FIG. 7D and FIG. 7E. FIG. 7A FIG. 7B, FIG. 7C, FIG. 7D and FIG. 7E are block diagrams showing an automated setting operation of security. In FIG. 7A, FIG. 7B, FIG. 7C, FIG. 7D and FIG. 7E, the same reference numerals are attached to the same constituents in FIG. 1. In FIG. 7A, FIG. 7B, FIG. 7C, FIG. 7D and FIG. 7E, CLm (m=1, 2 . . . n) represents "n" number of client devices CL1, CL2 . . . CLn allowed to connect to the AP 6. SSID0 represents to mean that there is no multiple SSID and VLAN in the case of this automated setting operation.

In this automated setting of security as described above, (refer to FIG. 5 and FIG. 6), in the beginning, all of the client devices CLm of connection destination are permitted to connect with the AP 6 without security (No WEP). The server device 4 having the management tool 12 acknowledges an ID information (MAC address etc.) of the client device CLm connected with the AP 6, and transmits a group of encryption values for the client devices CLm to be given a permission for connection after the client devices CLm are determined to be permitted for connection. In this case, WEP key information (WEP 48) is delivered to the client device CLm. A new security setting is performed by using the group of encryption values for the client devices CLm and the AP 6 for mutual communication between the devices. In this case, security level is enhanced in stepwise manner from the state of a lower level since it is dangerous to send high level security setting information such as a recognition key without encryption (no security).

Then, for example, a WEP key information of WEP 48 [bit] is transmitted for the client device CLm given a permission for connection in the state of no security (No WEP). The security setting of WEP 48 [bit] is executed at the client device CLm received the WEP key information (WEP 48) based on the WEP key information. Similarly, the side of the AP 6 is enabled to perform communication by the security setting of in WEP 48 [bit].

In this case, to the client device CLm set in the communicable state with WEP 48 [bit], the AP 6 immediately transmits a next group of encryption values, for example, WEP key information of WEP 64 [bit]. Security setting is performed by WEP 64 [bit] at the client device CLm received the WEP key information (WEP 64). Similarly, at the AP 6 side, it is only necessary to perform the security setting with WEP 64 [bit] for communication.

In accordance with the above steps, the security level is enhanced in a stepwise manner, to reach at the highest level of the security level for the client devices CLm. In the end of the security setting, client devices CLm having connection in the highest security level only remain to be able to perform requested communication. In this case, the highest level of security level is, for example, the highest level of security level held by the AP 6.

Figure 7A:
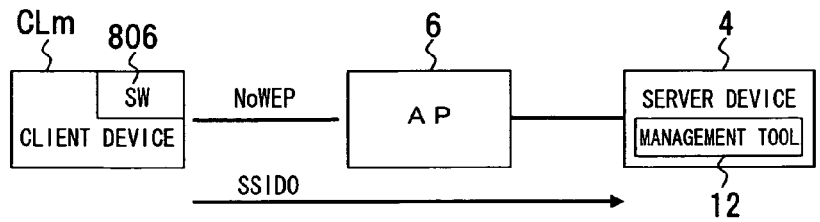
FIG. 7A through FIG. 7E are block diagrams showing an automated setting operation of security.

As FIG. 7A shows, the client devices CLm having permission for connection without security setting (No WEP) inform MAC information through the AP 6 to the server device 4, the server device 4 acknowledges whether or not the client devices CLm are terminals in the list of the registered permission for connection in the server device 4.

Figure 7B:
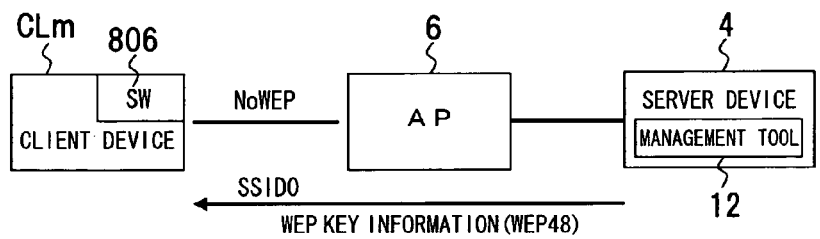

As FIG. 7B shows, if the client devices CLm are permitted for connection, WEP key information is delivered for the client devices CLm from the server device 4 through the AP 6. The security setting software 806 (refer to FIG. 4) of the client devices CLm receives this WEP key information for changing the security setting for WEP 48 [bit].

The above processing in FIG. 7A and FIG. 7B are performed against all the client devices CL1, CL2, . . . CLn, and enable them to perform communication by WEP setting. Similarly, WEP setting is performed in the AP 6.

Figure 7C:
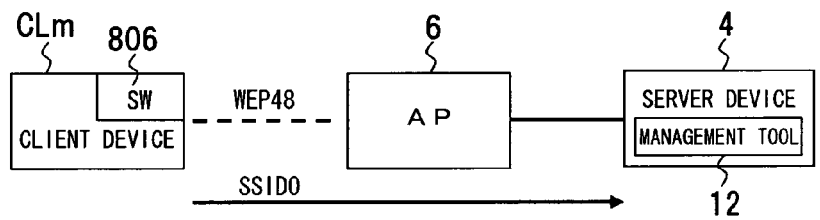

As FIG. 7C shows, the client device CLm connected in WEP 48 [bit] transmits MAC information to the server device 4 through the AP 6 for being stored in the server device 4, and for acknowledging again whether or not the client device CLm is an object for permission for connection.

Figure 7D:
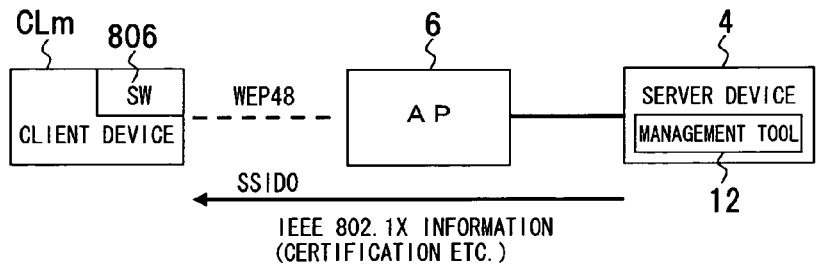

In this case, as FIG. 7D shows, if the client devices CLm are the devices permitted for connection, security setting information (such as certification) for IEEE802.1X is assigned for the devices from the server device 4 through the AP 6. The security setting software 806 (refer to FIG. 4) of the client devices CLm receive IEEE802.1X setting information for changing the security setting into IEEE802.1X.

The above described setting process of changing security level from WEP 48 [bit] to IEEE802.1X is executed for all the client devices CLm of connection destination so that all the client devices CLm are able to communicate in IEEE802.1X setting, the AP 6 is also changed in IEEE802.1X security setting.

Although, not shown in the figure, if the client devices CLm are the devices permitted for connection, the server device 4 may provide the client devices CLm with WEP 64 [bit] as WEP key information through the AP 6, so that the security setting of the client device CLm is changed into WEP 64 [bit]. As for the client device CLm permitted for connection with WEP 64 [bit], the server device 4 may receive through the AP 6 MAC information from the connected client devices CLm so that the connected client devices CLm are acknowledged again whether or not it is an object for permission for connection.

Figure 7E:
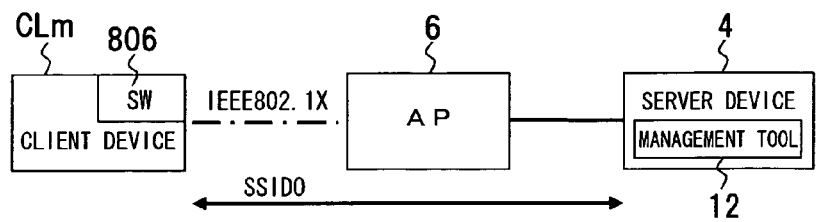

As FIG. 7E shows, all the client devices CLm complete connection in the final security level by setting in IEEE802.1X, each client device CLm is able to communicate formally with the server device 4 through the AP 6 by the wireless LAN 10.

In the above described automated setting of security, the security levels (SL) can be enhanced in stepwise manner shown as in FIG. 8. FIG. 8 is a table showing an example of security setting levels. As this table shows, content of security level can be selected optionally, for example, Example 3 in the table shows SL=2, 3 in Example 1 or SL=1, 3 in Example 2 are omitted for setting the security level of WPA at SL=2. The total number of security level is optional.

As described above, security of the client devices CLm can be automatically set from the side of the AP 6, in addition, final security level is set through multiple security levels (SL) in a stepwise manner so that there is a smaller chances of risk against stealing of a group of encryption values by a third party during security setting, so that the communication safety is increased.

Second Embodiment

Figure 9:
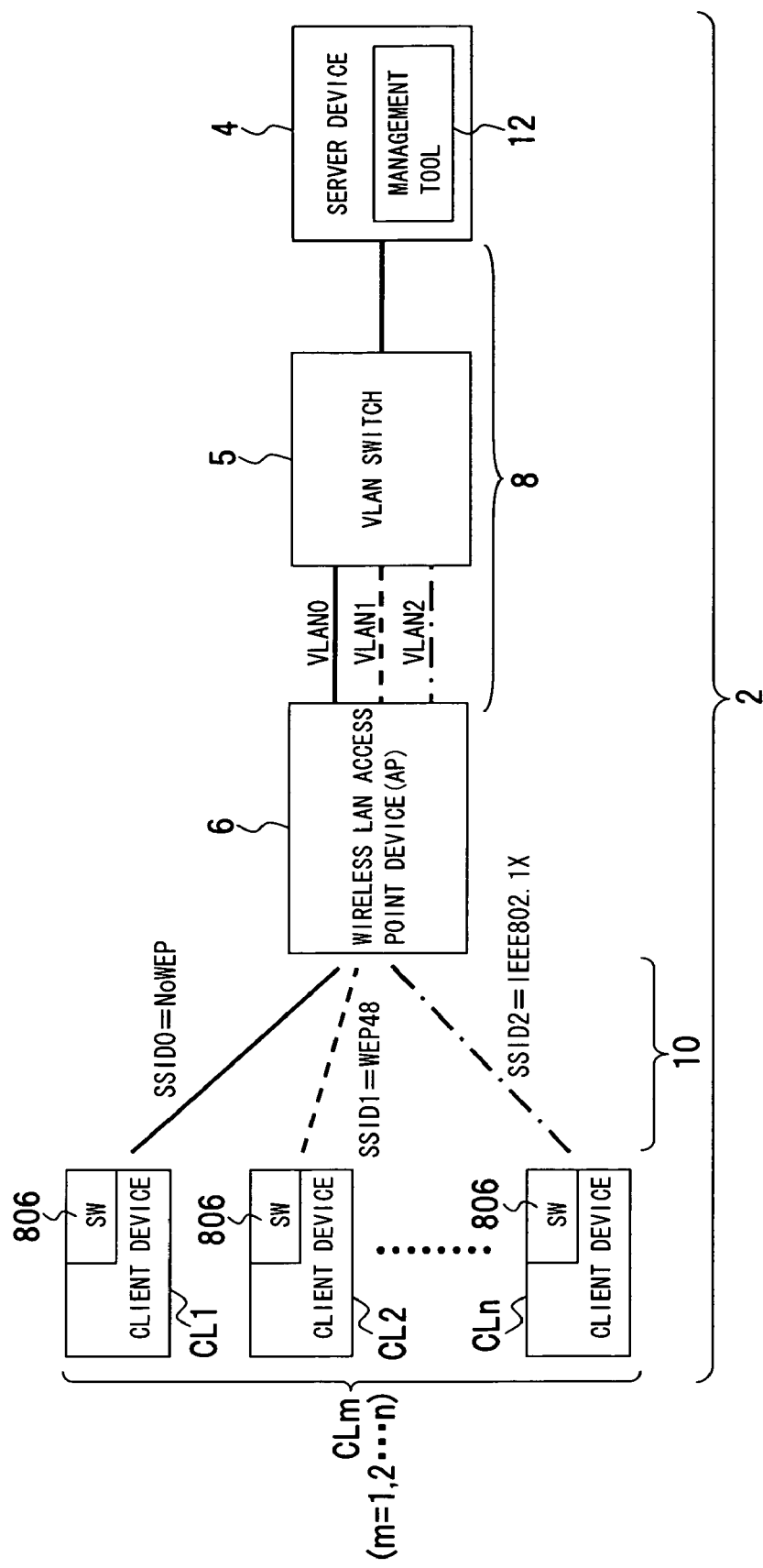
FIG. 9 is a block diagram showing of a wireless LAN device according to a second embodiment of the present invention.

A second embodiment of the present invention is described referring to FIG. 9. FIG. 9 is a block diagram showing outline of a wireless LAN device according to the second embodiment of the present invention. In FIG. 9, the same reference numerals are attached to the same constituents in FIG. 1.

The wireless LAN device 2 according to the second embodiment, a plurality of Service Set Identifier (hereinafter SSID)/virtual LAN (hereinafter VLAN) are included using a single AP 6, security setting is provided for every SSID. In other words, a plurality of SSID is set for the AP 6 having a single wireless interface, that is, the baseband processor 620, the transceiver part 622 and the power amplifier part 624 (refer to FIG. 3), in addition, VLAN can be set each one of a plurality of SSID respectively for setting security separately. SSID is an identifier (ID) to identify a network or the client devices C11, CL2, ... CLn defined by alphanumeric characters. By setting the same SSID for the AP 6 and the client devices CLm as connecting devices, communication can be enabled. In this case, the AP 6 is provided with LAN ports corresponding to the number of client devices CL1, CL2, ... CLn, and is accessed by the client devices CL1, CL2, ... CLn through the LAN ports. In addition, VLAN is a virtual communication network, and is provided with a function which divides the network optionally without being limited by the physical network structure. More specifically, VLAN is provided with a function that the client devices CLm are logically divided into multiple groups by using a switching device, etc. compatible for VLAN.

VLAN switching device 5 is disposed between the server device 4 and the AP 6, a plurality of SSID/VLAN is set in the AP 6, and a different security setting can be set for each SSID. VLAN switching device 5 is a switching hub compatible with VLAN and has a function to logically divide the client devices into a plurality of groups. The same SSID is set for the client devices CLm and the AP 6. As described above, the client devices CLm store therein the security setting software 806 (refer to FIG. 4) for operating in cooperation with the security setting software 120 of the management tool 12 in the server device 4. In this case, the wired LAN 8 is configured between the server device 4 and the AP 6 through the VLAN switching device 5, and VLAN0, VLAN1, VLAN2 represent separate wired LANs set by switching of the VLAN switching device 5.

According to the above configuration, multiple SSID/VLAN can be configured using a single AP 6. According to this configuration, operation of communication of the AP 6 cannot be reduced while security can be set automatically for every setting of each SSID.

In the wireless LAN device 2 (refer to FIG. 9) according to this embodiment of the present invention, as the server device 4, server device having same configuration as the server device 4 shown in FIG. 2 can be used. As AP 6, access point device having same configuration as the AP 6 shown in FIG. 3 can be used, and as the client devices CLm, client devices having same configuration as the client devices CLm shown in FIG. 4 can be used, so that descriptions for such configuration example are omitted.

Figure 10:
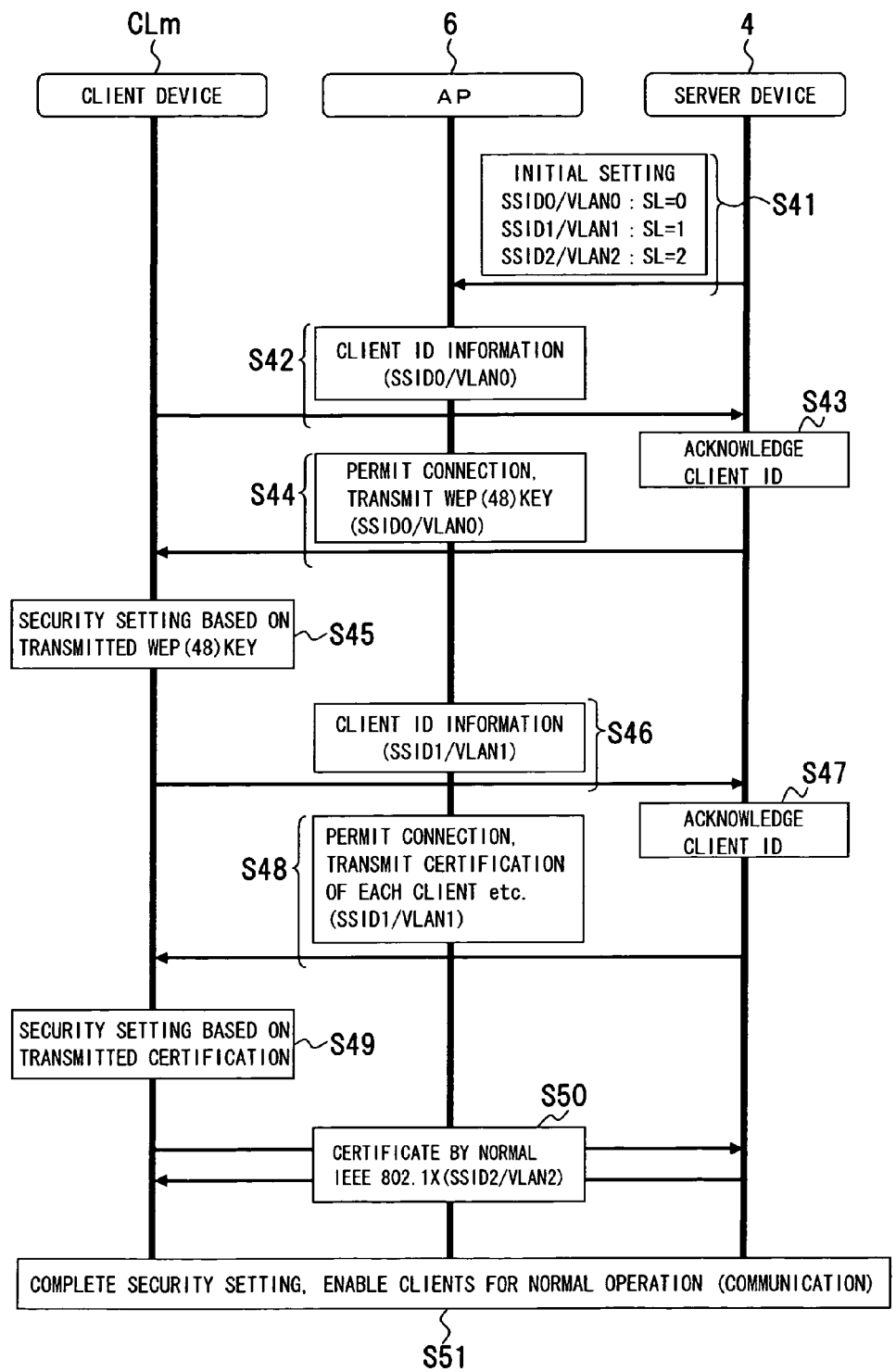
FIG. 10 is a flow chart showing sequential steps on an automated security setting of a client device, an access point device, and a server device.

The automated setting of security is described referring to FIG. 10. FIG. 10 is a flow chart showing sequential steps of an automated setting of security. In FIG. 10, the same reference numerals are attached to the same constituents in FIG. 9.

In this case, a plurality of SSIDs and VLANs exists. In this automated setting of security, SSID0/VLAN0:SL=0, SSID1/VLAN1:SL=1, and SSID2/VLAN2:SL=2 are instructed from the server device 4 to the AP 6 as an initial setting of security level (Step S41). Based on this initial security level, the server device 4 receives client ID information (SSID0/VLAN0) as identification information from a client device CLm through the AP 6 (Step S42). This client ID information includes the above described MAC information, etc. representing the client device CLm. The server device 4 acknowledges the client ID based on the received client ID information (Step S43), and determines whether or not the client device is a client registered in the list in the server device 4. Connection is permitted if the client device CLm transmitted the client ID is a registered client in the server 4, permission of connection is given to the client device CLm through the AP 6 and a WEP (48) key as encryption information (a group of encryption values) is transmitted through the AP 6 (Step S44).

Security setting is performed at the client device CLm based on the transmitted WEP (48) key (Step S45). Next, the server device 4 receives a client ID information (SSID1/VLAN1) as an identification information from the client device CLm through the AP 6 (Step S46). The server device 4 acknowledges the client ID again based on the received client ID information (Step S47), and determines whether or not the client device is a client registered in the list in the server device 4. Continuous connection is permitted if the client device CLm transmitted the client ID is a registered client in the server 4, permission of connection is given to the client device CLm through the AP 6, and a certification of the client device CLm as encryption information (a group of encryption values) is transmitted through the AP 6 (Step S48).

Security setting is performed at the client device CLm based on the certification transmitted from the server device 4 (Step S49), a normal IEEE802.1X recognition (SSID2/VLAN2) is performed (Step S50).

The security setting is completed through such client identification and security setting in stepwise manner of SL=0, SL=1 and SL=2. The security setting performed client device CLm is thus enabled to perform normal operation (communication) (Step S51). In this case, the above described steps S41 through S51 are performed for all of the client devices CLm for enabling all of the client devices CLm to perform normal operation after completion of the security setting.

According to the above structure, security setting can be implemented for all the client devices CLm (=CL1, CL2 ... CLn) respectively and simultaneously from the server device 4 through the AP 6. In addition, security can be set through multiple security levels therefore a group of encryption values can not be stolen by a third party on the way of the security setting so that the communication safety is assured. In this case, since a plurality of SSID are used and the operation of the AP 6 is not interrupted during security setting, the automated setting of security can be performed for the client device CLm without disturbing communication of other client devices CLm.

Figure 11:
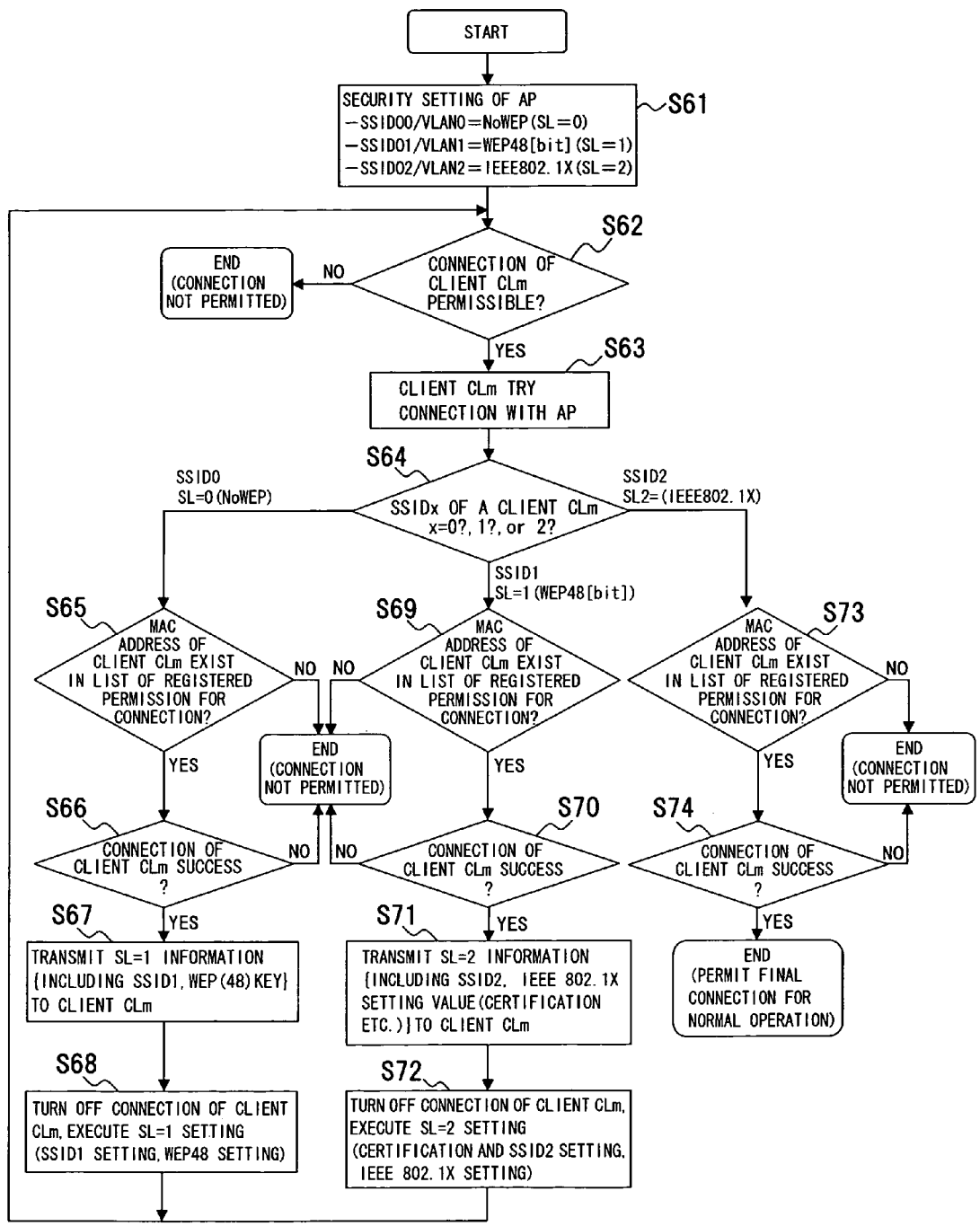
FIG. 11 is a flow chart showing a security setting method and a security setting program according to a second embodiment of the present invention.

Next, process of the security setting software 120 in the management tool 12 is described referring to FIG. 11. FIG. 11 is a flow chart showing a security setting method and a security setting program.

In the flow chart shown in FIG. 11, "m" represents a client number of, "n" represents number of client devices, client devices CLm (CL1, CL2 . . . CLn) can perform security setting at each of optional timing. SL stands for security level, for example, SL=0: No WEP, SL=1: WEP48 [bit], SL=2 IEEE802.1X In the automated setting of security, the sever device 4 instructs the AP 6 for initial setting of security level, the security level of the AP 6 is set as, for example, SSID0/VLAN0=NoWEP (SL=0), SSID1/VLAN1=WEP48 [bit] (SL=1), SSID2/VLAN2=IEEE802.1X (SL=2) (Step S61).

After the above initial setting, it is judged whether or not the client device CLm is a connection permissible client or not (Step S62), if not connectable, operation terminates. If the connection is permissible, the client device CLm tries to connect to the AP 6 (Step S63). It is determined if a setting value "x" of SSIDx of the client CLm is any one of x=0, x=1 or x=2 (Step S64). If x=0: SSID0 {SL=0 (No WEP)}, it is determined whether or not MAC address of the client device CLm exists in the list of the registered permission for connection in the server device 4 (Step S65). If the client device CLm is registered in the list, it is judged whether or not the connection of the client device CLm is a success (Step S66). If the client device CLm does not exist in the list at Step S65, the client device CLm is not permitted for connection, similarly, if connection of the client device CLm fails at the Step 66, the client device CLm is also not permitted for connection, and operation is therefore terminated.

If the connection of the client device CLm is a success, the security level SL=1 information (including SSID1, WEP48 bit-key) is transmitted as encryption information (Step S67). After the connection of the client device CLm is disconnected, SL=1 setting (SSID1 and WEP48 setting) is performed (Step S68) and the flow returns to Step S62.

Again, decision of connection permissible client or not (Step S62), connection trial (Step S63), determination of a setting value "x" of SSIDx (Step S64) are performed. If x=1: SSID1 {SL=1 (WEP48 [bit])}, it is determined whether or not MAC address of the client CLm is in the list of the registered permission for connection in the server device 4 (Step S69), if the client device CLm is a registered client in the list, it is determined whether connection of the client device CLm is successful or not (Step S70). If the client device CLm does not exist in the list at Step S69, the connection of the client CLm is not permitted. If the connection of the client CLm fails at Step S70, similarly, the connection is not permitted, and the process terminates accordingly.

If the connection of the client CLm is a success, security level SL=2 information {including SSID2 and IEEE802.1X setting value (certification etc.)} as encryption information is transmitted to the client device CLm (Step S71). After the client device CLm is disconnected, SL=2 setting {SSID2, IEEE802.1X settings} is performed (Step S72) and the flow returns to Step S62.

Again, judge of connection permissible client or not (Step S62), connection trial (Step S63), determination of setting value "x" of SSIDx (Step S64) are performed. If x=2: SSID2 {SL=2 (IEEE802.1X)}, it is determined whether or not MAC address of the client CLm is in the list of the registered permission for connection in the server device 4 (Step S73), if the client device CLm is registered in the list, it is determined whether connection of the client device CLm is successful or not (Step S74). If the client device CLm does not exist in the list at Step S73, the connection of the client CLm is not permitted. If the connection of the client CLm fails at Step S74, similarly, the connection is not permitted, and the process terminates accordingly.

If the connection of the client CLm is successful, the client device CLm becomes to be able to perform normal operation as a result of final permission for connection, and all process are terminated.

Next, automated setting operation of security is described referring to FIG. 12 A, FIG. 12 B, FIG. 12 C, FIG. 12 D, and FIG. 12 E. FIG. 12 A, FIG. 12 B, FIG. 12 C, FIG. 12 D, and FIG. 12 E are block diagrams showing an automated setting operation of security. In FIG. 12 A, FIG. 12 B, FIG. 12 C, FIG. 12 D, and FIG. 12 E, the same reference numerals are assigned to the same constituents in FIG. 1. In FIG. 12, the client devices CLm (m=1, 2 . . . n) represents "n" number of client devices CL1, CL2, . . . CLn to be permitted for connection to the AP 6. This automated setting operation is in the case of the structure having multiple SSIDs and VLANs. SSID0, SSID1 and SSID2 in the diagram show the multiple SSIDs.

In the AP 6, it is possible to set multiple SSIDs in one radio frequency interface, set separate VLAN respectively and set separate security setting respectively. VLAN0 is set to SSID0, VLAN1 is set to SSID1, and VLAN2 is set to SSID2 (thus VLANx is set to SSIDx).

SSID0 is a setting for all client devices CLm to be permitted without security (No WEP) to connect to the AP 6. SSIDx (x≠0) means an optional security setting.

First, the client device CLm is connected with SSID0 of the AP 6. ID number (MAC address) of the connected client device CLm is acknowledged by the security setting software 120 of the management tool 12 of the server device 4, a group of encryption values are transmitted for the client devices CLm to be permitted for connection.

An optional number of SSIDx is prepared for the AP 6 that the group of encryption values is used, the client devices CLm perform security setting by using the transmitted group of encryption values and connect with the SSIDx again for enabling communication between the devices. In this case, it is dangerous to transmit a high level security setting information such as a identification key etc. without encryption (no security), the security level is enhanced in a stepwise manner from the lower security level.

WEP key information of WEP48 [bit] is transmitted to the client device CLm that connection is permitted in the state of no security (No WEP)

The client device CLm sets security of WEP 48[bit] by the received WEP key. At the side of the AP 6, SSIDy already set by the same WEP 48 [bit] is prepared, the client device CLm connects with the SSIDy of the AP 6 again for enabling communication.

In this case, after the communication is settled, immediately, for example WEP key information of WEP 64 [bit] is transmitted from the AP 6 to the client CLm, the client device CLm sets security of WEP 64 [bit] by the received WEP key. At the side of the AP 6, SSIDz already set by the same WEP 64 [bit] is prepared, and the client device CLm connects with the SSIDz of the AP 6 again for enabling connection.

In this manner, security level is enhanced in a stepwise manner to the highest level of the security that the client device CLm is provided with. Finally, only the client devices CLm successfully connected with the highest security level can be remained and objected communication. In this case, upper limit of the highest security level is, for example, the highest security level of the AP 6.

Figure 12A:
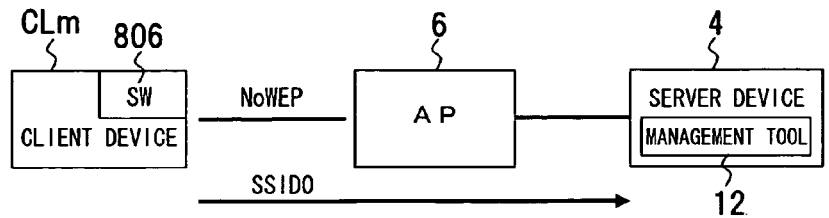
FIG. 12A through FIG. 12E are block diagrams showing an automated setting operation of security.

As FIG. 12A shows, permission for connection is given to SSID of the AP 6 in the state of no security (NoWEP). The client device CLm permitted for connection transmits MAC information thereof to the server device 4 through the AP 6. It is acknowledged whether or not the client device CLm is a terminal in the list of the registered permission for connection in the server device 4, that is, a connection destination.

Figure 12B:
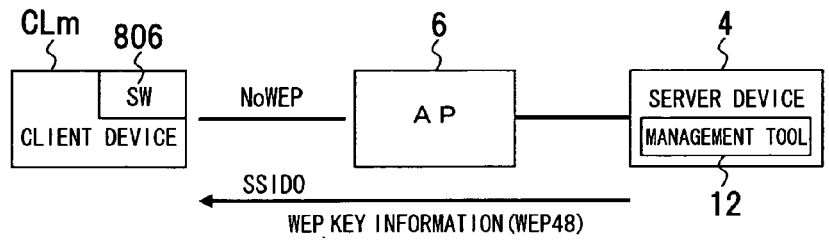

If the client device CLm is permitted for connection, as FIG. 12B shows, the server device 4 assigns a WEP key information to the client device CLm through the AP 6. The client device CLm receives the WEP key information by using the security setting software 806 (refer to FIG. 4) for changing the security setting for WEP 48 [bit].

Figure 12C:
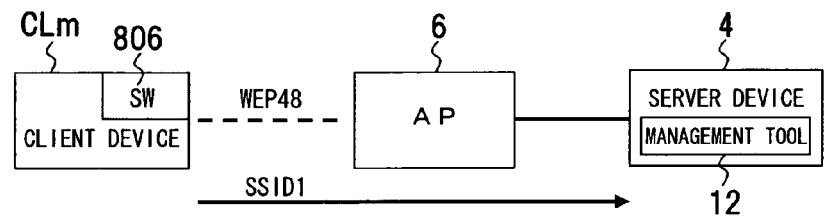

As FIG. 12C shows, the client device CLm is connected with SSID1 of the AP 6, as for the client CLm connected in WEP 48 [bit]. the server device 4 receives MAC information from the connected client device CLm through the AP 6 to re-acknowledge whether or not the client device CLm is permissible for connection.

Figure 12D:
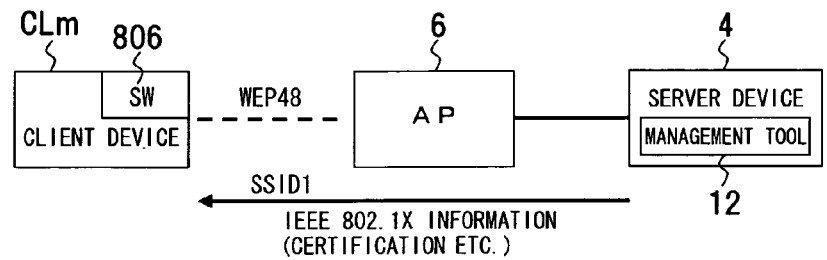

In this case, if the client device CLm is a device permitted for connection, as FIG. 12D shows, the server device 4 assigns the client device CLm a setting information (such as certification etc.) used for IEEE802.1X through the AP 6, the client device CLm receives IEEE802.1X setting information by the security setting software 806 (refer to FIG. 4) for changing the security setting for IEEE802.1X.

Setting process for converting the security level from WEP 48 [bit] to IEEE 802.1X is executed for all of the client devices CLm of connection objection respectively, all client devices CLm are then enabled to communicate in the setting of IEEE 802.1X, and the AP 6 is also converted in the setting of IEEE 802.1X.

Although, not shown in the figure, if the client device CLm is a client permitted for connection, the server device 4 assign WEP 64 [bit] as WEP key information to the client device CLm through the AP 6 and the security setting is converted in WEP 64 [bit]. As for the client device CLm connected in WEP 64 [bit], the server device 4 receives, through the AP 6, MAC information from the client device CLm being connected, for re-acknowledging whether the client device CLm is an object client permissible for connection.

Figure 12E:
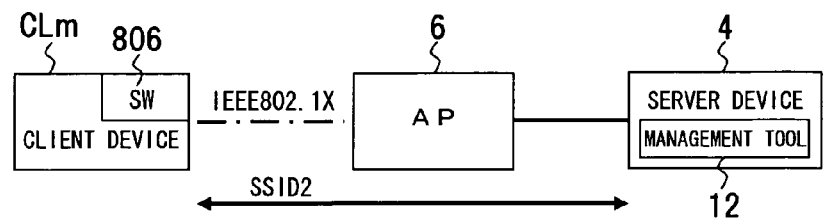

As FIG. 12E shows, the client device CLm is connected with the SSID2 of the AP 6 again, and all the client devices CLm is set by IEEE802.1X setting as final security level, and completed for connection. Each client device CLm is enabled to perform normal communication with the server device 4 through the AP 6 with the wireless LAN.

FIG. 13 is a table showing other example of security levels (SL) of the above-described automated setting of security. These setting processes are repeated for "n" number of client devices CL1, CL2 . . . CLn to complete the security setting.

In this manner, operation of the AP 6 is not stopped during security setting process in progress in case where multiple SSID are used so that communication by other client devices CLm are not disturbed for setting security in the client devices CLm automatically. In addition, as described above, the security setting of the client devices CLm can be set automatically from the side of the AP 6 without manual setting. Further, the security level can be enhanced to the final level through the plurality of security levels so that risk for a group of encryption values during security setting to be stolen by a third party can be reduced, and the communication safety is enhanced.

In addition, not only making the security level higher in a stepwise manner, but also the security level set at a higher level can be lowered in stepwise manner. In terms of system, such procedure is effective if the certification is considered no more necessary.

Examples of modifications to the above-described embodiments are listed as follows:

(1) In the above embodiments, the AP 6 is installed independently from the server device 4, however, the server device 4 and the AP 6 can be integrated as one structure, and also the present invention can be applied for a wireless LAN without the use of the AP 6.

(2) The AP 6 may be a structure provided with a computer, and also a relay having a switching device.

According to the present invention, automated security setting of the wireless communication network with the connection destination is realized. Security levels of the wireless communication network and the connection destination to be connected can be set in a stepwise manner, thereby security setting for a specific connection destination can be implemented without disturbing operations of other connection destination, and protecting from stealing by a third party.

Although the most preferred embodiments of the present invention have been described hereinabove, the present invention is not intended to be limited to the description and can naturally be modified or changed by one skilled in the art based on the gist of the present invention defined in claims or disclosed in the specification, and it is needless to say that such modifications and changes are within the scope of the present invention.

What is claimed is:

1. A security setting method, the security being set for one or a plurality of devices of connection destinations, the method being performed in a wireless communication device of wireless communication network, the method comprising:
    obtaining identification information of one or a plurality of the devices of the connection destinations from the devices of the connection destinations, and distinguishing, by a processor included in the wireless communication device, whether a device of a connection destination is registered in the wireless communication device based on the identification information;
    giving, by the processor, first encryption information to a device registered in the wireless communication device, to set first security for the device registered in the wireless communication device, using the first encryption information;
    obtaining the identification information from the device registered in the wireless communication device under setting of the first security; and
    giving, by the processor, second encryption information to the device registered in the wireless communication device, under the setting of the first security, to set second security for the device registered in the wireless communication device, using the second encryption information,
    wherein the encryption information set for the device registered in the wireless communication device is changed in incremental steps.

2. The security setting method of claim 1, further comprising:
    giving identification information to the devices of the connection destinations to configure virtual communication network with respect to each piece of the identification information, and giving, by the processor, the encryption information for each device of a connection destination that is given the identification information,
    wherein said giving identification information is controlled by the processor.

3. The security setting method of claim 1, wherein the second encryption information has security level higher than the first encryption information.

4. A non-transitory computer-readable recording medium storing a security setting program to be executed by computer of a wireless communication device configuring wireless communication network with one or a plurality of devices of connection destinations, the security setting program causing the computer to perform a method, the method comprising:
obtaining identification information of one or a plurality of the devices of the connection destinations from the devices of the connection destinations, and distinguishing, by the computer, whether a device of a connection destination is registered in the wireless communication device based on the identification information;
giving, by the computer, first encryption information to a device registered in the wireless communication device, to set first security for the device registered in the wireless communication device, using the first encryption information;
obtaining the identification information from the device registered in the wireless communication device under setting of the first security; and
giving, by the computer, second encryption information to the device registered in the wireless communication device, under the setting of the first security, to set second security for the device registered in the wireless communication device, using the second encryption information,
wherein the encryption information set for the device registered in the wireless communication device is changed in incremental steps.

5. The non-transitory computer-readable recording medium storing a security setting program of claim 4, the method further comprising:
giving identification information to the devices of the connection destinations to configure virtual communication network with respect to each piece of the identification information, and giving the encryption information for each device of a connection destination that is given the identification information.

6. A wireless communication network system having a wireless communication device connected to one or a plurality of devices of connection destinations, wherein
the wireless communication device includes a processor,
obtains identification information of one or a plurality of the devices of the connection destinations from the devices of the connection destinations, and distinguishes, by the processor, whether a device of a connection destination is registered in the wireless communication device based on the identification information,
gives, by the processor, first encryption information to a device registered in the wireless communication device, to set first security for the device registered in the wireless communication device, using the first encryption information,
obtains the identification information from the device registered in the wireless communication device under setting of the first security, and
gives, by the processor, second encryption information to the device registered in the wireless communication device, under the setting of the first security, to set second security for the device registered in the wireless communication device, using the second encryption information,
wherein the encryption information set for the device registered in the wireless communication device is changed in incremental steps.

7. The wireless communication network system of claim 6, wherein
the wireless communication device includes a wireless communication part performing wireless communication to one or a plurality of the devices of the connection destinations, permits to connect with a device of a connection destination that is not given encryption information, and gives the first encryption information to the device of the connection destination if the device of the connection destination is registered.

8. The wireless communication network system of claim 6, wherein
the wireless communication device gives identification information to the devices of the connection destinations to configure virtual communication network with respect to each piece of the identification information, and gives the encryption information for each device of a connection destination that is given the identification information.

9. The wireless communication network system of claim 6, further comprising:
an access point device that wirelessly communicates with one or a plurality of the devices of the connection destinations.

10. The wireless communication network system of claim 6, wherein
the processor distinguishes the device of the connection destination as a connectable object if the identification information obtained by the wireless communication device is registered in the wireless communication device.

11. A wireless communication network system having a server device connected to one or a plurality of devices of connection destinations, the wireless communication network system comprising:
an access point device that wirelessly communicates with one or a plurality of the devices of the connection destinations; and
a switch installed between the access point device and the server device, and forms virtual communication network between the server device and a device of a connection destination,
wherein a processor of the server device distinguishes whether the device of the connection destination is registered in the server device based on identification information of one or a plurality of the devices of the connection destinations obtained from the devices of the connection destinations,
gives first encryption information to a device registered in the server device, to set first security for the device registered in the server device, using the first encryption information,
obtains the identification information from the device registered in the server device under setting of the first security, and
gives second encryption information to the device registered in the server device, under the setting of the first security, to set second security for the device registered in the server device, using the second encryption information, and
wherein the encryption information set for the device registered in the server device is changed in incremental steps.

12. A client device connected to a server device or an access point device through wireless communication network, the client device comprising:

a wireless communication part that wirelessly communicates with the server device or the access point device; and a processor that sets security for the server device or the access point device, using encryption information that is set for the client device, wherein the wireless communication part transmits identification information to the server device or the access point device, wherein in a case that based on the identification information, the server device or the access point device distinguishes the client device as a connectable object, the wireless communication part receives first encryption information from the server device or the access point device, and the processor sets first security, using the first encryption information, the wireless communication part receives second encryption information from the server device or the access point device under setting of the first security, and the processor sets second security, using the second encryption information, and wherein the client device changes the encryption information set for the client device in incremental steps.

13. The client device of claim 12, wherein
identification information is given by the server device, virtual communication network to the server device is configured with respect to the identification information, and the encryption information is given.

* * * * *